US010338866B1

(12) United States Patent
Tsuchiya

(10) Patent No.: US 10,338,866 B1
(45) Date of Patent: Jul. 2, 2019

(54) IMAGE PROCESSING APPARATUS CONFIGURED TO GENERATE AND STORE DATA REPRESENTING USER OPERATIONS SO THAT USER OPERATIONS CAN BE REPRODUCED USING SUCH DATA

(71) Applicants: KABUSHIKI KAISHA TOSHIBA, Tokyo (JP); TOSHIBA TEC KABUSHIKI KAISHA, Tokyo (JP)

(72) Inventor: Masamitsu Tsuchiya, Susono Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/918,964

(22) Filed: Mar. 12, 2018

(51) Int. Cl.
*H04N 1/00* (2006.01)
*G06F 3/12* (2006.01)
*G06F 3/041* (2006.01)
*G06F 21/31* (2013.01)

(52) U.S. Cl.
CPC .......... *G06F 3/1237* (2013.01); *G06F 3/0416* (2013.01); *G06F 21/31* (2013.01)

(58) Field of Classification Search
None
See application file for complete search history.

(56) References Cited

U.S. PATENT DOCUMENTS

2008/0218498 A1* 9/2008 Yoshioka ............... G06F 21/34
345/204
2018/0041650 A1* 2/2018 Takahashi .......... G03G 15/5016

FOREIGN PATENT DOCUMENTS

JP 2008-305211 A 12/2008
JP 2012-137520 A 7/2012

* cited by examiner

*Primary Examiner* — Andrew H Lam
(74) *Attorney, Agent, or Firm* — Kim & Stewart LLP

(57) ABSTRACT

An image processing apparatus according to an embodiment includes a communication interface, a user interface, a display device, a storage device, and a printer. A processor determines if an operation event occurs. If the operation event occurs, the processor generates log data corresponding to the operation event, captures, at predetermined capture intervals over a predetermined period, a screen image corresponding to the information currently displayed on the display device, and controls the storage device to store: the generated log data, time information indicating a time of the operation event, and each screen image captured over the predetermined interval. When at least one screen image is stored in the storage device in association with time information corresponding to a received reproduction start time, the processor generates reproduction data including each screen image and text corresponding to the associated log data and the time information, and outputs the reproduction data for display.

18 Claims, 5 Drawing Sheets

IMAGE PROCESSING APPARATUS CONFIGURED TO GENERATE AND STORE DATA REPRESENTING USER OPERATIONS SO THAT USER OPERATIONS CAN BE REPRODUCED USING SUCH DATA

FIELD

Embodiments described herein relate generally to an image processing apparatus and a method for providing log data for an image processing apparatus.

BACKGROUND

In the related art, when an error occurs in an image processing apparatus, a cause of the problem is analyzed by referring to a log file in which operations or the like are recorded, or by referring to a manually recorded image. However, in some cases, certain events may not be clear from the log file such as a screen transition, a state of a screen display when a user performed an operation, and a timing of the operation relative to the screen transition. On the other hand, when performing error analysis using a recording, the user's operation may be obscured by the user's hands. In addition, during recording, a camera shake and a recording mistake may occur. Therefore, performing the error analysis using the log file or the recorded image takes time.

DETAILED DESCRIPTION

An image processing apparatus according to an embodiment includes a communication interface that performs data communication with an external information processing apparatus. A user interface receives input of an operation from a user. A display device displays information to a user. A storage device stores information. A printer forms an image on a sheet based on image data. A processor determines if an operation event occurs. If the operation event occurs, the processor generates log data corresponding to the operation event, captures, at predetermined capture intervals over a predetermined period, a screen image corresponding to the information currently displayed on the display device, and controls the storage device to store, in association with each other: the generated log data, time information indicating a time of the operation event, and each screen image captured over the predetermined interval. The processor receives a reproduction start time. When at least one screen image is stored in the storage device in association with time information corresponding to the reproduction start time, the processor generates reproduction data including each screen image captured over the predetermined interval and text corresponding to the associated log data and the time information, and outputs the reproduction data for display.

Hereinafter, the image processing apparatus and the method for providing log data for an image processing apparatus in the exemplary embodiment will be described with reference to the drawings.

Figure 1:
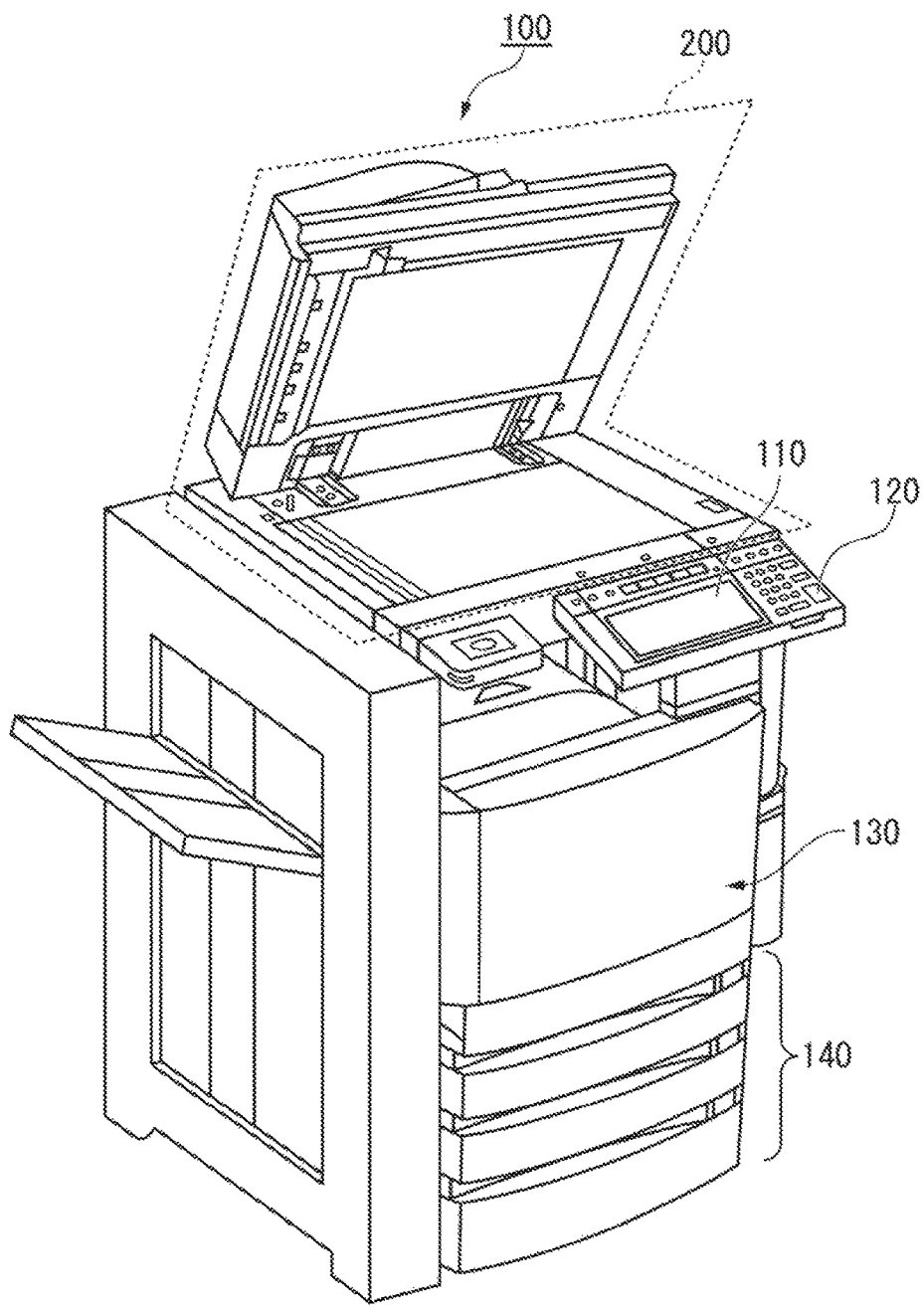
FIG. 1 illustrates an external perspective view of an image processing apparatus according to an embodiment.

FIG. 1 illustrates an external perspective view of an image processing apparatus 100 in the exemplary embodiment. The image processing apparatus 100 is a multifunction printer, for example. The image processing apparatus 100 includes a display 110, a control panel 120, a printer 130, a sheet supply unit 140, and an image reading unit 200. The printer 130 in the image processing apparatus 100 may be a device that fixes a toner image or an ink jet type device.

The image processing apparatus 100 reads an image appearing on the sheet, generates digital data based on the read image, and generates an image file based on the generated digital data. The sheet is, for example, a piece of paper with characters, images and the like are provided thereon. The sheet may be another medium as long as the image processing apparatus 100 can read the images thereon. In addition, the image processing apparatus 100 forms an image on a sheet using a developer such as toner. The sheet in this case is, for example, a piece of paper or a label paper. The sheet may be another medium as long as the image processing apparatus 100 can form an image on the surface thereof.

The display 110 is an image display device such as a liquid crystal display or an organic electro luminescence (EL) display. The display 110 displays various information items relating to the image processing apparatus 100.

The control panel 120 includes a plurality of buttons. The control panel 120 accepts operations input by a user. The control panel 120 outputs a signal corresponding to the input performed by the user to the control unit of the image processing apparatus 100. The display 110 and the control panel 120 may be configured as an integrated touch panel.

The printer 130 forms an image on the sheet based on the image information generated by the image reading unit 200 or based on image information received via a communication path. The printer 130 forms an image through, for example, processing described below. The image forming unit of the printer 130 forms an electrostatic latent image on the photoconductive drum based on the image information. The image forming unit of the printer 130 forms a visible image by applying developer to the electrostatic latent image. A specific example of the developer includes a toner. A transfer unit of the printer 130 transfers the visible image onto the sheet. A fixing unit of the printer 130 fixes the visible image on the sheet by heating and pressurizing the sheet. The sheet on which the visible image is fixed may be a sheet accommodated in the sheet supply unit 140 or may be a sheet moved by a hand.

The sheet supply unit 140 holds and supplies the sheets to be used for image forming by the printer 130.

The image reading unit 200 reads the reading target image information as light and dark of light. The image reading unit 200 records the read image information. The recorded image information may be transmitted to another information processing apparatus via a network. The recorded image information may be printed on the sheet by the printer 130.

Figure 2:
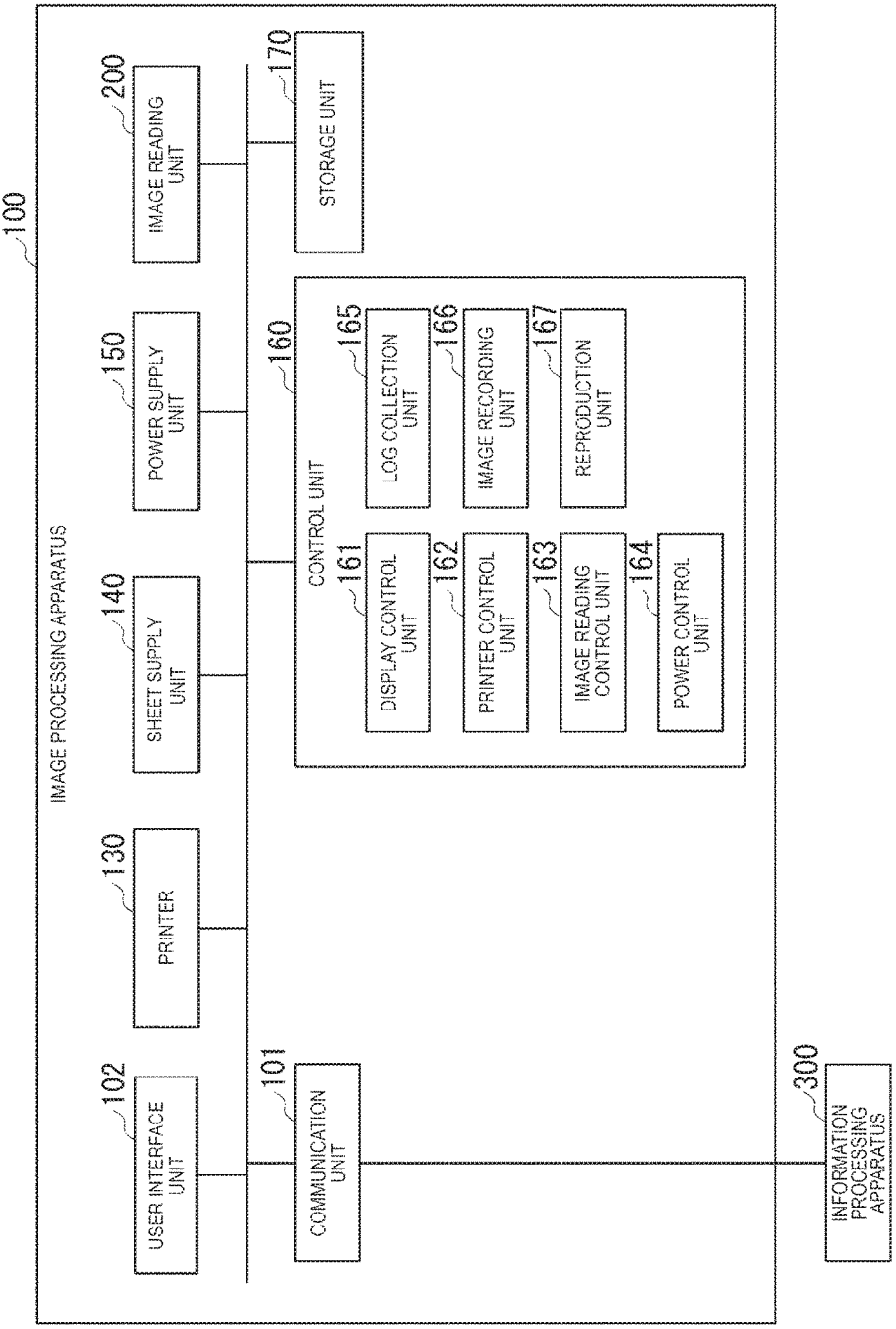
FIG. 2 illustrates a functional block diagram of the image processing apparatus.

FIG. 2 illustrates a functional block diagram of the image processing apparatus 100 in the exemplary embodiments. The image processing apparatus 100 includes a communication unit 101, a user interface unit 102, a printer 130, a sheet supply unit 140, a power supply unit 150, a control unit 160, a storage unit 170, and an image reading unit 200. Since the configurations of the printer 130, the sheet supply unit 140, and the image reading unit 200 are as described above, the description thereof will be omitted.

The communication unit 101 is a network interface. The communication unit 101 communicates with an information processing apparatus 300 via a communication path. The information processing apparatus 300 may be, for example, a personal computer or a server. In the drawing, only one information processing apparatus 300 is illustrated, but the number of information processing apparatuses 300 may be arbitrary.

The user interface unit 102 includes the display 110 and the control panel 120 in FIG. 1. The user interface unit 102 receives input of the user's operation and displays information to the user. Hereinafter, a case where the user interface unit 102 includes a touch panel will be described as an example.

The power supply unit 150 supplies power received from a power source to each unit.

The control unit 160 controls each unit. The control unit 160 includes a processor, a memory, and a hard disk drive (HDD). The processor is, for example, a central processing unit (CPU). The memory stores data to be directly referred to when the processor executes processing. The memory is, for example, a random access memory (RAM). The HDD is a non-transitory recording medium. The processor operates as the control unit 160 by reading, from the HDD, a computer program for causing a computer to execute processing, and executing the program. The control unit 160 includes a display control unit 161, a printer control unit 162, an image reading control unit 163, a power control unit 164, a log collection unit 165, an image recording unit 166, and a reproduction unit 167.

The display control unit 161 controls the touch panel to display an image. For example, the display control unit 161 controls the touch panel to display various screens for the user to input operations to the image processing apparatus 100. An example of the screens includes a log-in screen, a scan screen, a copy screen, a facsimile transmission screen, and various setting screens.

The printer control unit 162 controls the printer 130. The image reading control unit 163 controls the image reading unit 200. The power control unit 164 determines when to transition to an operation mode in which the power consumption is lower than that in a normal mode based on a length of time during which no data input and no user operation is performed on the image processing apparatus 100. The operation modes in which the power consumption is lower than that in the normal mode are, for example, a power saving mode and a sleep mode. If the transition to the power saving mode or the sleep mode is determined, the power control unit 164 controls the power supply unit 150 so as to stop the power supply to each unit according to the mode. In the sleep mode, the power supply is stopped to more units than in the power saving mode. The power control unit 164 transitions the operation mode to the normal mode if the data input or predetermined user's operation is performed during the power saving mode or the sleep mode. When the mode is shifted to the normal mode, the power control unit 164 restarts the power supply to each unit to which the power supply has been stopped.

The log collection unit 165 generates log data of the image processing apparatus 100. The log data is in a format that allows presentation of data contents using text. For example, the log data describes an input to the image processing apparatus 100, an output from the image processing apparatus 100, a user's operation performed on the image processing apparatus 100, the processing performed by the image processing apparatus 100, a data value used in the processing performed by the image processing apparatus 100, types of the screen displayed on the touch panel, and at least a part of the information on the operation mode of the image processing apparatus 100. The log collection unit 165 writes the generated log data and time information indicating the time when the log data was obtained in association with each other into the storage unit 170. The log collection unit 165 may generate a log file in which a plurality of log data items generated during a certain period are recorded and may write the log file into the storage unit 170.

The image recording unit 166 generates captured image data of the touch panel (display 110) at a predetermined time interval during a period from a time when a first condition is satisfied to a time when a second condition is satisfied. The captured image data is image data which is captured from the image displayed on the touch panel. By shortening the capturing interval, the time series captured image data can be used as moving image data. The first condition is a condition in which it is determined that the user starts an operation on the image processing apparatus 100. For example, the first condition is reception of a job for the image processing apparatus 100, the user's log-in, or an input of recording start instruction by the user. The second condition is a condition in which it is determined that the user finishes the operation on the image processing apparatus 100. For example, the second condition is a user's log-off, an input of a recording stop instruction by the user, or the shift of the mode to the power saving mode or to the sleep mode. The image recording unit 166 writes the captured image data and the time information indicating the generation time of the captured image data in association with each other into the storage unit 170.

The reproduction unit 167 reads the time series captured image data from the storage unit 170 and causes the information processing apparatus 300 connected via the communication unit 101 to display the time series captured image data as a moving picture. The reproduction unit 167 may display the log data on the information processing apparatus 300 in addition to displaying the moving image of the captured image data. In addition, the reproduction unit 167 may display the text corresponding to the log data while adding additional image information to the moving image display of the captured image data based on the log data having the time information same as the time information associated with the captured image data or the time information within a predetermined difference. For example, the reproduction unit 167 generates image information indicating the user's operation based on the log data and displays the generated text image while adding the generated image information to the moving image display of the captured image data on the information processing apparatus 300.

The storage unit 170 is a main storage device. The main storage device is, for example, an HDD. The storage unit 170 stores computer programs and various data. The data stored in the storage unit 170 includes the log data and the captured image data.

Figure 3:
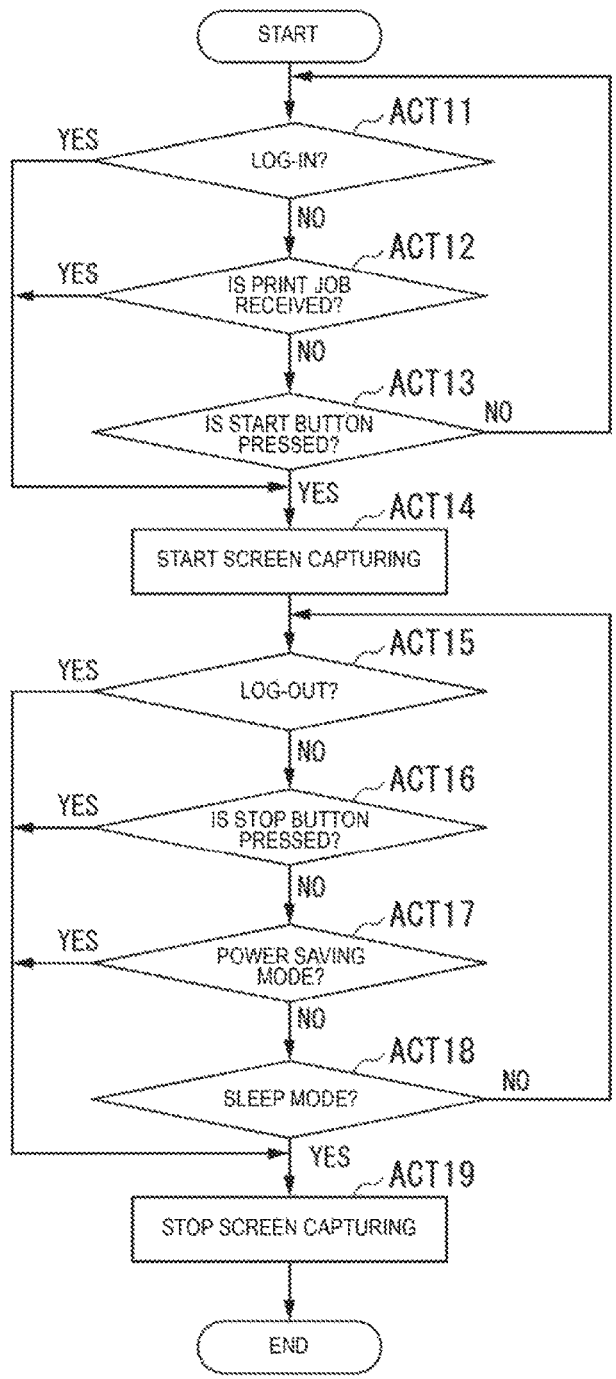
FIG. 3 illustrates a flowchart of screen capturing processing by the image processing apparatus.

FIG. 3 illustrates a flowchart of screen capturing processing by the image processing apparatus 100. The image recording unit 166 determines whether or not the user performs log-in on the image processing apparatus 100 (ACT11). The log-in is performed by an operation on the user interface unit 102 or by receiving a log-in request from the information processing apparatus 300. If it is determined that the log-in is performed (YES in ACT11), the image recording unit 166 proceeds to the processing in ACT14.

If it is determined that the log-in is not performed (NO in ACT11), the image recording unit 166 determines whether or not the control unit 160 receives a print job (ACT12). For example, the control unit 160 receives the print job from the information processing apparatus 300 connected to the communication unit 101. Alternatively, the print job may be generated inside the control unit 160 according to an instruction input by the user via the user interface unit 102. If it is determined that the print job is received (YES in ACT12), the image recording unit 166 proceeds to the processing in ACT14.

If it is determined that the print job is not received (NO in ACT12), the image recording unit 166 determines whether or not the user presses an image capture start button using the user interface unit 102 (ACT13). If it is determined that the user presses the image capture start button (YES in ACT13), the image recording unit 166 proceeds to the processing in ACT14. If it is determined that the user does not press the image capture start button (NO in ACT13), the image recording unit 166 returns the process to ACT11.

If YES is determined in ACT11, ACT12 or ACT13, i.e., an operation event occurs, the image recording unit 166 starts the screen image capturing (ACT14). After starting the screen image capturing, the image recording unit 166 captures a screen image displayed on the touch panel at predetermined capture intervals and generates the captured image data. When the user touches the touch panel, if the colors of the button or menu touched by the user are changed and displayed during a certain period of time, the display control unit 161 may shorten the capture interval during the certain period of time. In this way, the image recording unit 166 can collect the captured image data indicating the button or menu selected by the user. The image recording unit 166 writes the time information and the captured image data in association with each other into the storage unit 170. The time information indicates the time when the image capturing was performed.

The image recording unit 166 determines whether or not the user performs log-out (ACT15). The log-out is performed by an operation on the user interface unit 102 or by receiving a log-out request from the information processing apparatus 300. If it is determined that the log-out is performed (YES in ACT15), the image recording unit 166 proceeds to the processing in ACT19.

If it is determined that the log-out is not performed (NO in ACT15), the image recording unit 166 determines whether or not the user presses an image capture stop button on the user interface unit 102 (ACT16). If it is determined that the user presses the image capture stop button (YES in ACT16), the image recording unit 166 proceeds to the processing in ACT19.

If it is determined that the user does not press the image capture stop button (NO in ACT16), the image recording unit 166 determines whether or not the mode is shifted to the power saving mode (ACT17). If it is determined that the mode is shifted to the power saving mode (YES in ACT17), the image recording unit 166 proceeds to the processing in ACT19.

If it is determined that the mode is not shifted to the power saving mode (NO in ACT17), the image recording unit 166 determines whether or not the mode is shifted to the sleep mode (ACT18). If it is determined that the mode is shifted to the sleep mode (YES in ACT18), the image recording unit 166 proceeds to the processing in ACT19. If it is determined that the mode is not shifted to the sleep mode (NO in ACT18), the image recording unit 166 returns the process to ACT15.

If it is determined as YES in ACT15, ACT16, ACT17 or ACT18, the image recording unit 166 stops the screen capturing started in ACT14 (ACT19).

The order of the determination processing items in ACT11 to ACT13 may be arbitrary. In addition, the order of the determination processing items in ACT15 to ACT18 may be arbitrary.

The log collection unit 165 always collects the log data regardless of the first condition and the second condition. Alternatively, the log collection unit 165 may collect the log data during the period from the time when the first condition is satisfied to the time when the second condition is satisfied, that is, during the period in which the image recording unit 166 performs the screen image capturing. Alternatively, the log collection unit 165 may collect the log data in a period determined based on conditions different from the first condition and the second condition used by the image recording unit 166.

Figure 4:
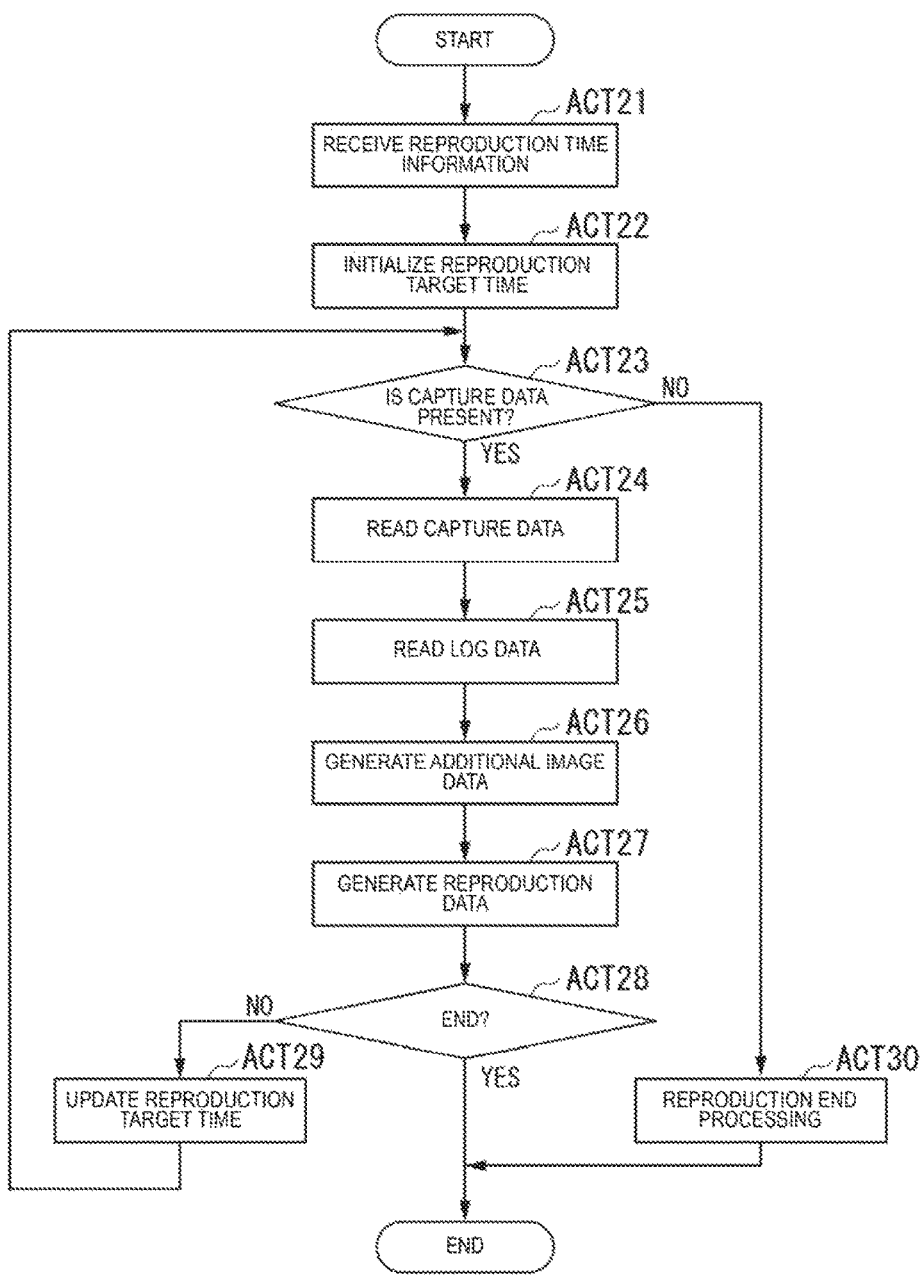
FIG. 4 illustrates a flowchart of screen capture reproduction processing by the image processing apparatus.

FIG. 4 illustrates a flowchart of screen image capture reproduction processing by the image processing apparatus 100. The reproduction unit 167 receives reproduction start time information from the information processing apparatus 300 (ACT21). The reproduction target time is initialized with the reproduction start time (ACT22).

The reproduction unit 167 determines whether or not time information in which a difference from the reproduction target time is less than a threshold is present in the time information of the captured image data stored in the storage unit 170 (ACT23). The threshold value is, for example, the capture interval. The reproduction unit 167 may perform the determination only for the time information that is after the reproduction target time. If it is determined that the time information in which the difference from the reproduction target time is less than the threshold is present (YES in ACT23), the reproduction unit 167 reads the captured image data that is associated with the time information which is closest to the reproduction target time from the storage unit 170 (ACT24).

The reproduction unit 167 reads the log data from the storage unit 170 based on the reproduction target time and the time information associated with the log data (ACT25). Specifically, among the time information associated with log data, the reproduction unit 167 specifies the time information in which the difference from the reproduction target time is within a predetermined range and which is closest to the reproduction target time. The reproduction unit 167 reads consecutive time series log data including the log data associated with the identified time information from the storage unit 170. Among the log data to be read, the number of log data items having the time information before the specified time information and the number of log data items having the time information after the specified time information may be determined in advance, or may be received from the information processing apparatus 300. Alternatively, the reproduction unit 167 sets the reproduction target time or a time backward from the reproduction target time by a predetermined time as a log reading start time, and sets a time when a predetermined time has elapsed from the reproduction target time as a log reading end time. The reproduction unit 167 reads the log data having the time information from the set log reading start time to the set log reading end time.

The reproduction unit 167 generates additional image data based on the log data read in ACT25 (ACT26). The additional image data is image data indicating an operation performed by the user on the screen. For example, the reproduction unit 167 identifies the log data of the time information closest to the time information of the captured image data read in the ACT24 among the log data read out in ACT25. The reproduction unit 167 determines the position touched by the user on the touch panel based on the specified log data. The reproduction unit 167 retrieves the additional image data indicating that the user touched, from the storage unit 170. The reproduction unit 167 determines the display position of the additional image data relative to the captured image data based on the position where the user touched the touch panel. In addition, the reproduction unit 167 determines a display time of the additional image data. For example, the reproduction unit 167 sets the display time of the additional image data to a predetermined length. The display time may be longer than an updated length of the reproduction target time. Alternatively, the reproduction unit 167 may determine the display time of the additional image data based on a difference between the time information of the specified log data and the time information of the log data indicating the next screen shift or the user's operation.

The reproduction unit 167 generates reproduction data for displaying the captured image data, the log data, and the additional image data. The reproduction unit 167 adds information of the reproduction target time to the reproduction data and transmits the result to the information processing apparatus 300 (ACT27).

The reproduction unit 167 determines whether or not to end the reproduction (ACT28). If it is determined that the reproduction is not to end (NO in ACT28), the reproduction unit 167 adds a predetermined update time to the current reproduction target time and updates the reproduction target time (ACT29). The update time is, for example, the capture interval. The reproduction unit 167 may receive an update time from the information processing apparatus 300. The reproduction unit 167 repeats the processing items subsequent to ACT23.

The information processing apparatus 300 displays each of the reproduction data received from the image processing apparatus 100 on the screen in an order of the reproduction target time. The information processing apparatus 300 may set the time for displaying one piece of reproduction data so as to be the same as the update time in ACT29. Alternatively, the information processing apparatus 300 may set the time for displaying one piece of reproduction data so as to be shorter or longer than the update time according to the instruction input by the user.

In ACT23, if the reproduction unit 167 determines that the time information with the difference from the reproduction target time less than the threshold value is not present in the time information of the captured image data stored in the storage unit 170 (ACT23: NO), the reproduction unit 167 ends the reproduction end processing (ACT30). For example, for the reproduction end processing, the reproduction unit 167 generates screen data indicating a fact that that there is no captured image data to be reproduced, and transmits the screen data to the information processing apparatus 300. The information processing apparatus 300 displays the received screen data on the display.

In addition, in ACT28, if it is determined that the reproduction is to end (YES in ACT28), the reproduction unit 167 ends the processing. For example, if a reproduction end instruction is received from the information processing apparatus 300, the reproduction unit 167 determines to end the reproduction. Alternatively, the reproduction unit 167 determines to end the reproduction when the reproduction target time reaches the reproduction end time received from the information processing apparatus 300.

The reproduction unit 167 may generate a moving image file including the reproduction data of each reproduction target time, and may transmit the moving image file to the information processing apparatus 300.

In the processing described above, the reproduction data is displayed in the information processing apparatus 300, however, the data may be displayed on the user interface unit 102. In this case, the user inputs various instructions and values using the user interface unit 102.

Figure 5:
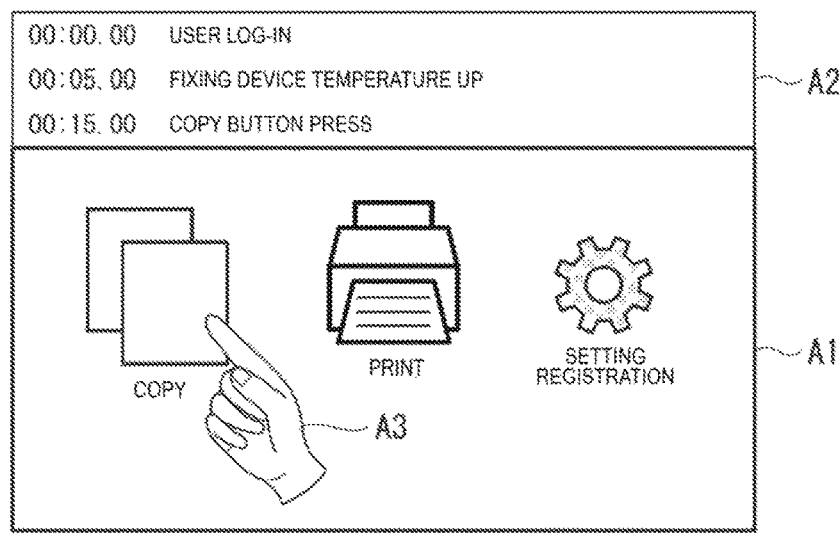
FIG. 5 illustrates an example of a reproduction screen.

FIG. 5 illustrates an example of the reproduction screen. In the drawing, a log data display area A2 for displaying the log data is provided above a captured image data display area A1 for displaying the captured image data. The position of the log data display area A2 may be an arbitrary position relative to the captured image data display area A1. In addition, the log data display area A2 may partially or entirely overlap the captured image data display area A1. In the overlapping area, the log data display area A2 is displayed above the captured image data display area A1.

The additional image data A3 is an image indicating that the user touches the screen. In the drawing, the additional image data A3 is an image of a hand. The position of the tip of the pointing finger on the additional image data A3 is the position touched by the user in the screen. The shape and color of the additional image data A3 can be arbitrary.

As described above, the image processing apparatus 100 records the user's operation of the key on the touch panel using the screen image capturing. After the screen image capturing, the image processing apparatus 100 edits the captured image data based on the log data and creates a pseudo-animation that imitates a series of operations. In addition, the image processing apparatus 100 stops screen image capturing during a period in which it is assumed that there is no user operation. Therefore, the image processing apparatus 100 can efficiently perform screen image capturing while preventing an increase of the captured image data size.

According to at least one exemplary embodiments described above, using the control unit 160, it is possible to collect and present useful information for analyzing the problem occurring in the image processing apparatus 100.

While certain embodiments have been described these embodiments have been presented by way of example only, and are not intended to limit the scope of the inventions. Indeed, the novel embodiment described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. An image processing apparatus comprising:
a communication interface configured to perform data communication with an external information processing apparatus;
a user interface configured to receive input of an operation from a user;
a display device configured to display information to a user;
a storage device configured to store information;
a printer configured to form an image on a sheet based on image data; and
a processor configured to:
determine if an operation event occurs, if the operation event occurs, during a predetermined period, generate log data including operation input received through the user interface and capture, at predetermined capture intervals, a screen image displayed on the display device, and store in the storage device, in association with each other: the generated log data, time information indicating a time of the operation event, and each captured screen image, and in response to receiving a reproduction start time, when at least one screen captured image is stored in the storage device in association with time information corresponding to the reproduction start time, generate reproduction data including the at least one captured screen image and text corresponding to the associated log data and the time information, wherein image data indicating the operation input received through the user interface is added to the at least one captured screen image, and output the reproduction data for display.

2. The apparatus according to claim 1, wherein:

the reproduction start time is received from the external information processing apparatus via the communication interface, and the processor controls the communication interface to output the reproduction data to the external information processing apparatus.

3. The apparatus according to claim 1, wherein the image data indicating the input is generated based on the corresponding log data.

4. The apparatus according to claim 3, wherein the reproduction data further includes position information of the image data indicating the input relative to the screen image.

5. The apparatus according to claim 4, wherein the operation event includes any one of an input being received in the user interface, a user log-in, and a print job for printing with the printer being received via the communication interface.

6. The apparatus according to claim 1, wherein the predetermined period is between the start of the operation event and any one of a user log-off, a shift of an operation mode to a lower power mode, and an instruction to stop recording.

7. The apparatus according to claim 1, wherein the predetermined capture interval is decreased during a screen transition of the display device in the predetermined period.

8. The apparatus according to claim 1, wherein the reproduction data is output as a moving image file.

9. The apparatus according to claim 1, wherein the reproduction data is generated and output for each of a plurality of the screen image.

10. A method of generating log data for an image processing apparatus that includes a communication interface that performs data communication with an external information processing apparatus, a user interface that receives input of an operation from a user, a display device that displays information to a user, a storage device that stores information, and a printer that forms an image on a sheet based on image data, the method comprising:

determining if an operation event occurs in the image processing apparatus;

if the operation event occurs, during a predetermined period, generating log data including operation input received through the user interface and capturing, at predetermined capture intervals, a screen image displayed on the display device, and storing in the storage device, in association with each other: the generated log data, time information indicating a time of the operation event, and each captured screen image and in response to receiving a reproduction start time, when at least one screen captured image is stored in the storage device in association with time information corresponding to the reproduction start time, generating reproduction data including the at least one captured screen image and text corresponding to the associated log data and the time information, and wherein image data indicating the operation input received through the user interface is added to the at least one captured screen image, and outputting the reproduction data for display.

11. The method according to claim 10, wherein:

the reproduction start time is received from the external information processing apparatus via the communication interface, and the reproduction data is output to the external information processing apparatus.

12. The method according to claim 10, wherein the image data indicating the input is generated based on the corresponding log data.

13. The method according to claim 12, wherein the reproduction data further includes position information of the image data indicating the input relative to the screen image.

14. The method according to claim 13, wherein the operation event includes any one of an input being received in the user interface, a user log-in, and a print job for printing with the printer being received via the communication interface.

15. The method according to claim 10, wherein the predetermined period is between the start of the operation event and any one of a user log-off, a shift of an operation mode to a lower power mode, and an instruction to stop recording.

16. The method according to claim 10, wherein the predetermined capture interval is decreased during a screen transition of the display device in the predetermined period.

17. The method according to claim 10, wherein the reproduction data is output as a moving image file.

18. The method according to claim 10, wherein the reproduction data is generated and output for each of a plurality of the screen image.

* * * * *